Nov. 19, 1946.	G. A. LYON	2,411,164
WHEEL STRUCTURE
Filed July 22, 1943	3 Sheets-Sheet 3
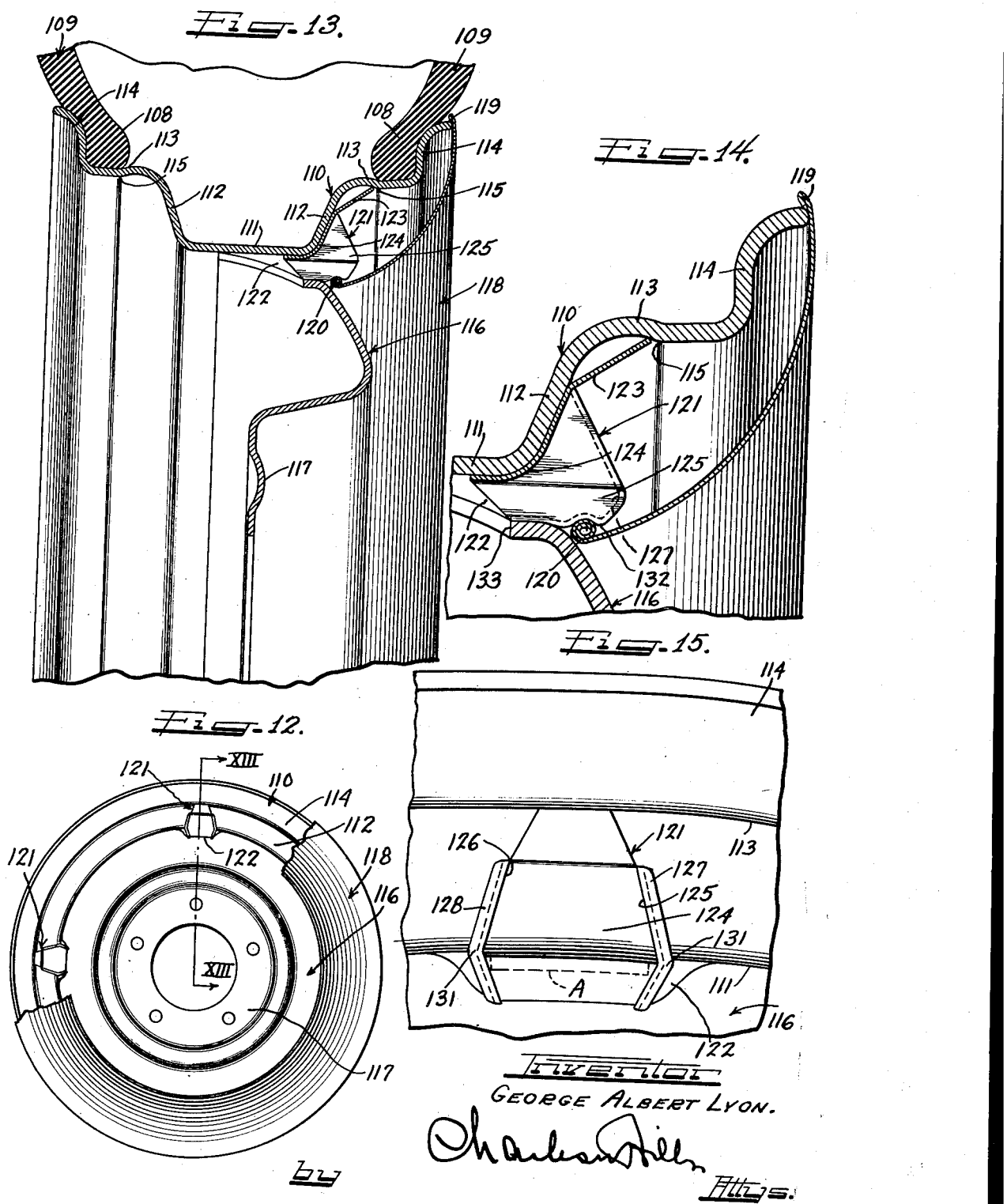
Inventor
GEORGE ALBERT LYON.

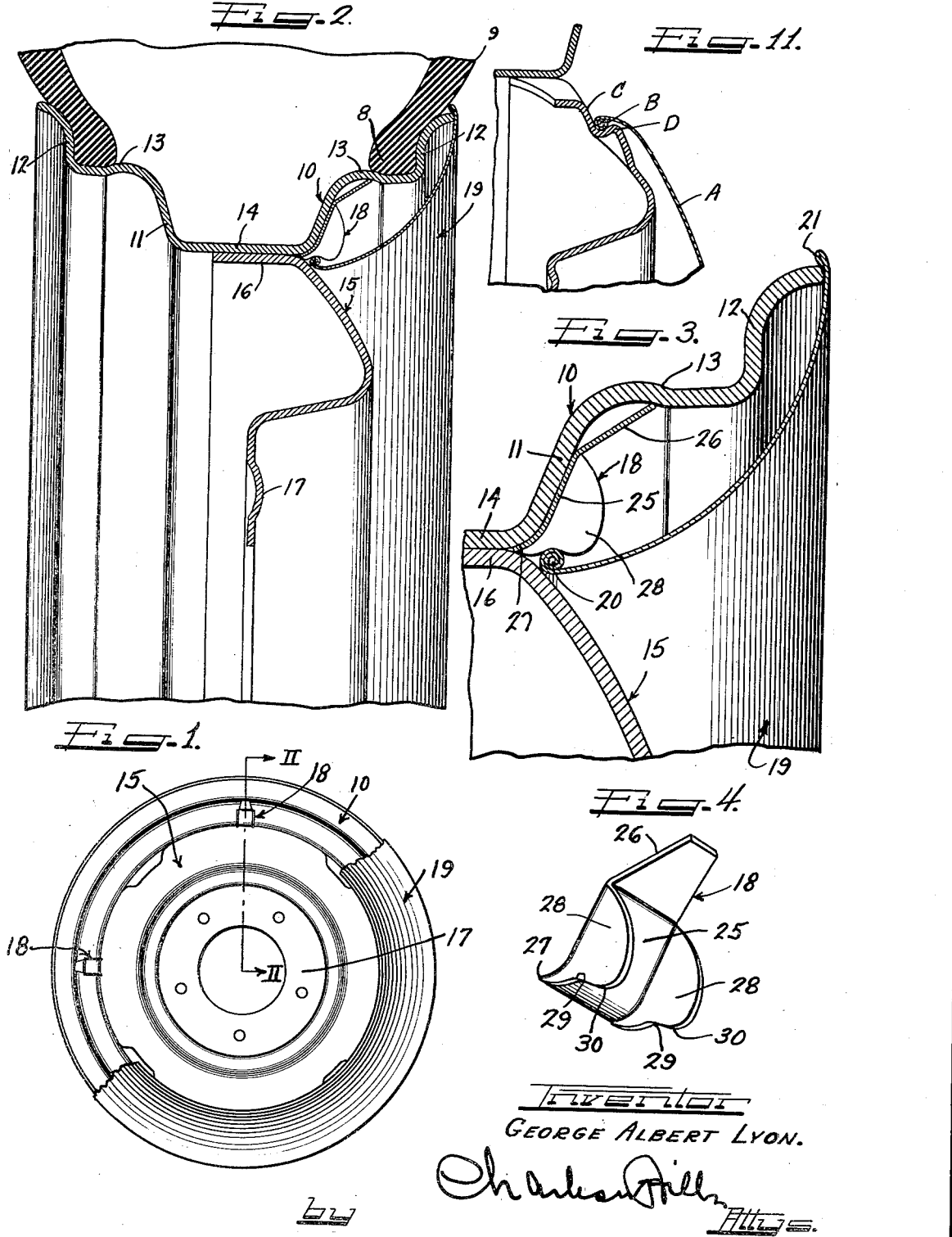

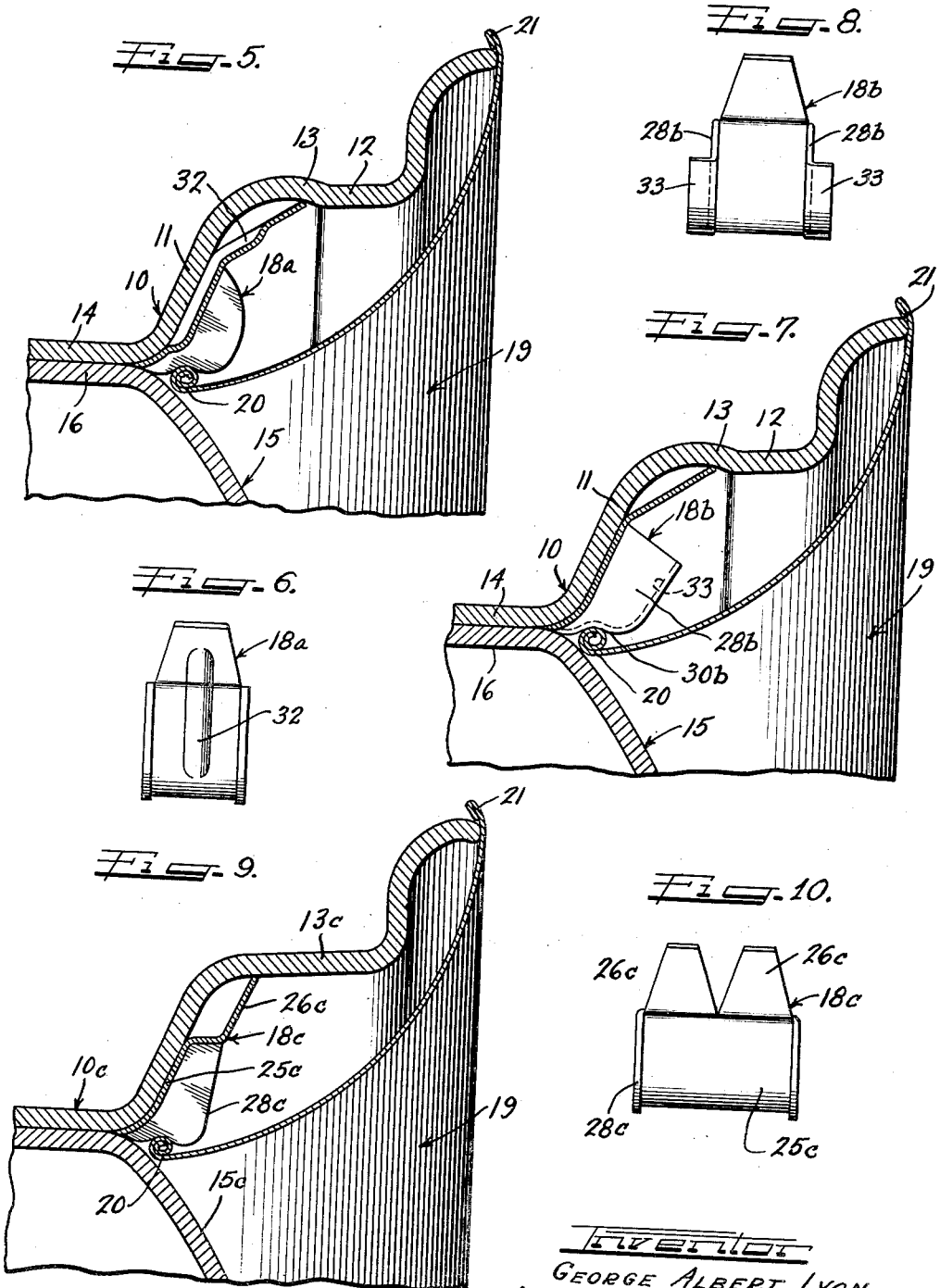

Patented Nov. 19, 1946

2,411,164

UNITED STATES PATENT OFFICE 2,411,164

WHEEL STRUCTURE

George Albert Lyon, Allenhurst, N. J.

Application July 22, 1943, Serial No. 495,680

12 Claims. (Cl. 301—37)

This application is a continuation in part of my application Serial No. 424,681, filed December 29, 1941, having been filed in the United States Patent Office during the pendency of that application.

This invention relates to a wheel structure, and more particularly to a novel structure for retaining a wheel cover on a wheel, which structure includes spring clips held on the wheel solely by reason of their engagement with parts of the wheel.

An object of this invention is to provide a simple and inexpensive way of retaining a wheel cover such as a trim ring on a wheel.

Another object of this invention is to provide a novel spring clip for use in the retention of a trim ring on a wheel, which clip is adapted to cooperate retainingly at its opposite end with the rim and body parts of a wheel, and which clip is held on the wheel solely by reason of its engagement with said parts.

Another object of this invention is to provide a wheel cover or trim ring which may be made of relatively thin material and still possess sufficient rigidity and strength so that it can properly cooperate with spring clip retaining means on the wheel.

Still another object of this invention is to so reinforce a relatively large trim ring at its place of cooperation on the wheel that the reinforcement will provide the ring with adequate rigidity to resist distortion and yet be sufficiently flexible as to be adapted to spring over retaining means on the wheel.

Still another object of this invention is to provide a novel spring clip which can be wedged into engagement with the body part of a wheel inside of a wheel opening and which adjacent this wedged engagement is provided with a shoulder over which a reinforced inner edge of a trim ring or wheel cover is passed for retaining cooperation therewith.

In accordance with the general features of this invention, there is provided in a wheel structure, including a multi-flanged tire rim part and a body part joined thereto at spaced intervals leaving wheel openings between the joined portions of the wheel parts, spring clip means for holding a wheel cover member on the wheel comprising a plurality of spaced clips each including a generally radially extending strip disposed over a flange of the rim part and having an outer edge wedged into engagement with a flange of the rim part and having an inner portion provided with a projection extending into a wheel opening for wedging engagement with a portion of the body part inside of the wheel opening and also provided with a shoulder outside of the wheel opening arranged so that a reinforced edge of a wheel cover or trim ring may be passed over this shoulder into retained cooperation therewith.

In accordance with other general features of this invention, there is provided in a wheel structure including a multi-flange tire rim part and a body part joined thereto, spring clip means for holding a wheel cover member on the wheel comprising a plurality of spaced clips each including a generally radially extending strip disposed over a flange of the rim part and having an outer edge wedged into engagement with an annular flange of the rim part and an inner edge wedged into engagement with the body part adjacent the junction of the wheel parts; this strip having an intermediate lateral flange provided with an undercut shoulder arranged to be engaged by a portion of a cover member for holding the cover member on the wheel.

In accordance with other general features of this invention, there is provided a relatively large annular wheel cover or trim ring which is made of such thin metal as to require reinforcement at an edge where it is in cooperation with the retaining means therefor, this reinforcement being provided by the multiple turning or rolling of an inner edge of the ring upon itself whereby the turned edge is made sufficiently resilient to resist buckling and distortion and yet be flexible enough to snap over retaining means on the wheel.

A further feature of the invention relates to the reinforcing of an edge of a wheel cover or hub cap made of relatively thin metal which edge is turned back upon itself a plurality of times to form a multiple thickness of metal at the edge whereby the edge will resist permanent distortion when subjected to the pressure of a pry-off tool.

In accordance with still other features of this invention, there is provided a novel wheel cover retaining spring clip comprising a strip of metal having oppositely turned edges for wedging engagement with parts of a wheel and having positioned between said edges lateral flange means each having an undercut shoulder at substantially right angles to the plane of the strip and arranged to cooperate retainingly with an edge of a wheel cover member.

Still another feature of the invention relates to the reinforcing of projecting ears on a spring clip so that said ears will have a greater rigidity and thus enable relatively thin sheet steel to be used in the manufacture of the clip.

Other objects and advantages of this invention will more fully appear from the following detailed description taken in connection with the accompanying drawings which illustrate several embodiments thereof, and in which:

Figure 1 is a front view of a wheel structure embodying the features of this invention and partly broken away in order to show the location of the spaced cover retaining clips;

Figure 2 is a vertical fragmentary enlarged cross sectional view taken on the line II—II of Figure 1 looking in the direction indicated by the arrows;

Figure 3 is a still further enlarged sectional view corresponding to the upper right hand portion of Figure 2 and illustrating clearly the manner in which a spring clip cooperates with the wheel parts and with the wheel cover member;

Figure 4 is a detail view in perspective showing one of the spring clips;

Figure 5 is a fragmentary sectional view similar to Figure 3 but illustrating a modification of the invention;

Figure 6 is an elevation of the modified form of the clip shown in Figure 5;

Figure 7 is a fragmentary sectional view corresponding to Figures 3 and 5 and illustrating a still further modification of the invention;

Figure 8 is an elevational view of the modified form of clip shown in Figure 7;

Figure 9 is a fragmentary sectional view similar to Figures 5 and 7 and illustrating a still further form of clip;

Figure 10 is a front elevation of the clip shown in Figure 9;

Figure 11 is a fragmentary sectional view of a modification of the invention taken in toto from my copending application Serial No. 306,527, filed November 28, 1939, Patent No. 2,308,615, issued January 19, 1943, and illustrating how the reinforcing feature of my invention can be applied to a wheel cover having the form of a hub cap;

Figure 12 is a front view of a wheel structure embodying the features of this invention and partly broken away to show how the spring clips are spaced from each other in their cooperation with the parts of the wheel;

Figure 13 is an enlarged fragmentary cross-sectional view taken on the line XIII—XIII of Figure 12 looking in the direction indicated by the arrows and showing in cross section the configuration of a spring clip, as well as the cross-sectional shape of the wheel cover or trim member disposed in cooperation therewith;

Figure 14 is an enlarged fragmentary cross-sectional view corresponding to the upper right hand portion of Figure 13 and showing more clearly the manner in which the spring clip is wedged into cooperation with a portion of the wheel body inside of a wheel opening and also showing a reinforced shoulder for retaining cooperation with a reinforced inner edge of the trim ring; and Figure 15 is a fragmentary front view of the clip in its retained engagement with the wheel part, the cover being removed so as to show clearly the front configuration of the spring clip and how a skid chain strap may be passed therethrough.

As shown on the drawings:

The reference character 10 designates generally a multi-flanged drop center type of tire rim which includes the usual radial flanges 11 and 12 and annular flanges 13, as well as a base flange 14 which is attached at spaced intervals to the usual wheel body part or spider 15. This spider or body part has as its center the usual bolt-on flange 17 by means of which the wheel may be attached to a suitable support on an automobile.

The drop center tire rim 10 is adapted to accommodate in a well known way a pneumatic tire 9 which has the usual beads 8 disposed inside of the flanges 12 of the rim and resting in the depressed portions of the axial flanges 13. It will be perceived that the depressed portion of this axial flange 13 provides a shoulder which tends to hold the bead in place on the rim as is now well known in the art. One of the features of this invention relates to the utilization of the shoulder provided by this depression in the flange 13 for aiding in the retention of my cover retaining clips on the wheel.

Attention is directed to the fact that in the different forms and modifications of the invention illustrated in the drawings I employed the same reference numerals to show the corresponding parts of the wheel and tire.

In Figures 1 to 4 inclusive, I have designated my novel wheel cover or trim ring generally by the reference character 19. This trim ring may be made of any suitable metallic sheet such, for example, as steel sheet, and by reason of certain features, which will be hereinafter discussed in detail, may be made of relatively thin sheet metal, since the features of my invention provide it with the requisite rigidity for it to cooperate with the retaining clips on the wheel, which clips are designated generally by the reference character 18.

The trim ring 19 includes an outer turned edge 21 which overlies an outer edge of the wheel rim and is juxtaposed to the side wall of the tire. The curvature of this trim ring is such that it apears to be a continuation of the side wall of the tire, so that if it is finished in white it gives the tire the effect of having a white side wall.

The inner edge 20 of this annular trim ring 19 is rolled or curled upon itself a plurality of times which, for example, may be one and one-half to two or more times and thus reinforces the inner edge of the trim ring. In other words, I provide the trim ring with rigidity and strength at the point of stress or where it cooperates with the retaining means on the wheel.

It should be noted that the inner edge of the cover 19 is adapted to be sprung over shoulders on my novel spring clips 18 which will be described more in detail hereinafter, and as a consequence the edge must be relatively strong in order to resist permanent distortion or buckling. In the application of this edge to the retaining clip it is sprung in its entirety out of a normal circular shape, so that when it is in cooperation with the retaining clip the edge is under tension and thus retains the cover 19 on the wheel. In other words, by reason of the fact that the edge has been sprung out of its normal shape when it is in cooperation with the clips, it has a tendency to spring back to its normal shape, and it is this resiliency or stressing of the edge that I utilize for the purpose of retaining the cover on the wheel.

Moreover, in the removal of the cover from the wheel, a pry-off tool is inserted under the beaded edge 20 for the purpose of forcibly prying the cover off the wheel. The arrangement of the edge with reference to the retaining clips is such that the edge is easily pressible into retaining cooperation with the clips but requires considerably more force in order to pry it free from its engagement with clips. The necessity of thus prying the wheel cover off the wheel in the manner above described further emphasizes the importance of the edge being reinforced so as to prevent permanent distortion or buckling of the edge either in its removal from the wheel or its application thereto.

I find that by reinforcing the edge 20 in the manner I have above described, namely, by providing it with a plurality of turns of metal, I am enabled to use much thinner metal in the cover than would be otherwise possible and still enable the cover to have the requisite amount of rigidity to resist permanent distortion or buckling.

This broad feature of reinforcing the edge of a cover by providing it with a bead having a multiple of turns of metal is broadly disclosed in my earlier filed copending application Serial No. 306,527, filed November 28, 1939. In order to make this clear, I have in Figure 11 illustrated a form of the invention which has been taken in toto from my earlier filed application and illustrating the above described reinforcing feature as being applied to the outer edge of a cover instead of to an inner edge as in the other forms of the invention shown in the present application. In addition, the invention is shown as being applied to a wheel cover in the form of a hub cap in Figure 11 instead of to a cover in the form of a trim ring as, for example, is shown in Figure 2.

In Figure 11, the reference letter A designates generally a circular hub cap made of relatively thin metal and having its outer marginal portion turned rearwardly and formed into a reinforcing bead B made up of a plurality of turns of tightly wound metal so as to rigidify this edge. This reinforced beaded edge B is cooperable with the spider C of a wheel, and more particularly with a plurality of equidistantly spaced protuberances D on the spider over which the edge B is springable in its entirety into stressed and retaining cooperation therewith. Broadly, therefore, the wheel cover or hub cap A has the same advantageous reinforcing feature of my invention as is utilized in the cover or trim ring 19 previously described. It might further be noted that this reinforcing feature is of even greater advantage in a wheel cover in the form of a trim ring than in a hub cap due to the larger diameter of the edge of the trim ring to which the feature is applied. In other words, the larger the edge the greater is the chance for that edge to become permanently distorted or buckled when stressed. By using a plurality of turns of closely curled metal in the bead of the edge, I am enabled to solve in a simple way the necessity for properly reinforcing this edge which is not only sprung in its application to the retaining means on the wheel but must be subjected to considerable stress when it is pried free of its cooperation with the wheel.

In Figure 4, I have illustrated in perspective one of my novel spring retaining clips 18. Any suitable number of these clips may be employed for the retention of the cover on the wheel, although, as shown in Figure 1, I specifically contemplate that four equidistantly spaced clips may be used. Since these clips are all identical, a description of one will suffice for all.

Each clip is made from metallic strip or sheet having the requisite metallurgical characteristics to provide it with rigidity and resiliency and includes a body portion 25 having oppositely turned extremities 26 and 27. The extremity 26 comprises a substantially straight but wedge shaped portion, the extreme outer edge of which is adapted to slide over the annular shoulder formed in the depressed axial flange 13 of the rim part 10. The other extremity 27 of the clip is curved axially rearwardly so as to conform closely to the shape of the junction of the flanges 11 and 14 against which the body 25 of the clip is adapted to abut. The extreme inner edge of the extremity 27 is adapted to be wedged into tight engagement with the spider 15 adjacent the junction of the flange 16 of the spider and the base flange 14 of the rim part.

The body portion 25 also includes relatively rigid, outwardly extending, parallel, and spaced lateral ears 28—28, each having a suitably curved outer edge and provided at its under side with a notch 29 which forms a shoulder 30 adapted to cooperate with the bead 20 of the cover in the retention of the same on the wheel.

In the application of the spring clip 18 to the wheel, it is pressed axially against the exposed flange 11 of the rim part until its extremity 26 snaps over the shoulder of the flange 13 thus resiliently wedging the clip between the flange 13 and the spider or body part 15. I find that the clip is so tightly held in this wedged position that considerable force is necessary before it can be pried free of the wheel. In order to pry it free, the edge of a pry-off tool or screwdriver may be inserted under the extremity 26, after which the clip may be forcibly pried out of its cooperation with the parts of the wheel.

After the clips 18 have been properly positioned and secured in place on the wheel as shown in Figure 1, the wheel cover 19 may be easily applied to the wheel by simply pressing it axially against the outer side of the wheel. In so doing, the beaded edge 20 contacts the shoulders 30 and is thus resiliently stressed in its entirety as it passes over the high spots of the shoulders 30 of the clips and until it is seated in the notched portions 29 of the clips. In this springing of the edge, the edge is not allowed to return completely to its normal position when it is seated in the notched portions 29 of the clips, and as a consequence it is under stress or tension when in this engaged position. It is this tension which causes the wheel cover to be held tightly in place on the wheel. Moreover, it is easier to apply the cover to the wheel than to remove it. In fact, to remove it, considerable force must be applied through the instrumentality of a pry-off tool or screwdriver, the blunt end of which can be inserted under the beaded edge 20 to pry forcibly loose the cover from the wheel.

In the modifications of my invention shown in Figures 5 to 10, I have used the same reference numerals as in the first described form to indicate identical parts common to these forms, and it will hence be understood that the same description as given in the case of the first form is also applicable to these common components or parts.

In Figures 5 and 6, I have illustrated a modified form of spring clip 18a for holding the trim ring or wheel cover 19 on the wheel. The principal difference between this clip 18a and the previously described clip 18 resides in the face that the clip 18a has its body portion provided with a depressed rib 32 extending vertically of the clip for transversely reinforcing the clip. This reinforcing rib 32 is advantageous in that it enables me to use relatively thin metal in the spring clip and yet have the requisite rigidity in the same.

In Figures 7 and 8, I have illustrated a modified form of spring clip 18b which differs principally from the clip 18 in the construction and reinforcement of its lateral ears 28b—28b. Each of these lateral ears 28b is provided with a reinforcing transversely turned flange 33 which rigidifies and strengthens the ears. Since this flange, as shown in Figure 7, extends around a substantial or major portion of the edge of the ear (shown by dotted lines in Figure 7), it is necessary to notch the flange by depressing the same as indicated at 29b in Figure 7. This depression in the flanged edge of the ear 28b results in the provision of a shoulder 30b which corresponds in function to that of the shoulder 30 of the first described form of clip 18. Otherwise, this form of the invention operates and functions in the same way as described in detail in connection with the first described embodiment.

In Figures 9 and 10, I have illustrated a still further form of spring clip 18c which differs principally from the clip 18 in that instead of having the single wedge-shaped extremity 26, it is provided with two aligned extremities 26c—26c. These wedge-shaped portions 26c project from the body portion 25c which is reinforced on its sides by lateral ears 28c corresponding in function to that of the ears 28—28 of the first form of the invention.

Since, in the modifications of the invention shown in Figures 5 to 10, the operation of the clips and the cover 19 is the same as in the preferred form shown in Figure 1, no further description of the same is deemed necessary. It might further be noted, however, that by using two outer projections 26c—26c on the clip as shown in the last described form, I am enabled to cause the clip to have biting engagement at two spaced points with the flange 13c of the wheel rim part 10c fastened at spaced intervals to the wheel body part 15c. This is advantageous in that it enables the clip to be tightly wedged under tension in position on the parts of the wheel without there being any shoulder or depressed section in the flange 13c of the rim part.

In Figures 12 to 15 inclusive I have illustrated a further modification of the invention wherein the spring clips are so formed as to actually extend into the wheel openings.

In this further modification, the reference character 110 designates generally a conventional drop center type of tire rim adapted to accommodate in the usual way a pneumatic tire 109 having beads 108 positioned within the side flanges of the rim part. The rim part includes a base flange 111, side flanges 112 and 114 which extend generally radially, and axial flanges 113. The flanges on the outer side of the wheel are adapted to cooperate with my wheel cover and retaining clips which will be described more in detail hereinafter.

Each of the flanges 111 is depressed so that the bead 108 fits in the depressed section and thus minimizes the likelihood of the bead shifting its position in the rim part upon puncture or blowout of the tire. This depressed section provides an annular shoulder 115 which I utilize in the retention of my spring clip 121 in position.

The base flange 111 is attached at spaced intervals to a wheel body part or spider, designated generally by the reference character 116, and which includes the usual central bolt-on flange 117 by means of which the wheel is attached to a suitable support on the vehicle in a manner well known to the those familiar with the wheel art. By reason of the fact that the base flange 111 of the rim part is only attached at spaced intervals to the body part 116 wheel openings 122 are provided between the joined portions of these parts which permit of the circulation of air through the wheel body and around the brake drum (not shown) in a manner also familiar to those skilled in this art.

I propose in accordance with the features of this invention to utilize the shoulder 115 on one of the flanges of the wheel rim part and the opening 122 in the body part in the retention of my novel spring clip 121 on the wheel. A plurality of these spring clips, as best shown in Figure 12, are used, and I have found that excellent results may be obtained by using four of these clips equidistantly spaced apart around the circumference of the body part 116. These identical clips are retained on the wheel solely by reason of their wedging engagement with the parts thereof and constitute the sole means for holding the wheel cover or annular trim ring 118 on the wheel.

The trim ring 118 is of a convex-concavo cross-sectional shape or, in other words, is curved or bulged outwardly between its inner and outer edges. The outer edge extends over the outermost edge of the cooperating flange 114 of the rim part and is turned as indicated at 119 so as to reinforce the edge and eliminate any sharpness. The inner edge, as best shown in Figure 14, is rolled or curled a plurality of times upon itself thus providing a beaded reinforced edge 120 for cooperation with the spring retaining clips 121. I preferably turn this edge at least several times upon itself so as to provide a multiple of thicknesses of metal at this edge which is subjected to stress when it is pressed into retaining cooperation with the spring clips. This feature enables the rigidifying of the inner edge of the trim ring which edge is of a relatively large diameter and also enables this edge to be sprung in its entirety over the shoulders of the spring clips without permanently distorting or buckling the edge.

The transverse curvature of the ring 118 is such that if it is finished on its exterior side with a white finish, it causes the tire to have the appearance of having a white side wall. In other words, the curved ring in effect appears as a continuation of the curved outer side wall of the tire 109. Due to the fact that this ring completely conceals the exposed surfaces of the outer flanges of the rim part, the tire appears to extend clear up to the body part 116.

The subject matter of this above described feature of reinforcing the edge is being covered in another copending application Serial No. 306,527.

Each of the spring clips is made of strip or sheet metal which may be relatively thin due to the way in which the clip is made and reinforced. Each clip embraces an outwardly inclined outer portion 123 having an extremity adapted to be spring-wedged behind the shoulder 115 of the cooperating flange 113 of the wheel rim part 110. This inclined portion 123 terminates on its inner side in a portion 124 which is curved inwardly and closely follows the shape of the side flange at its junction with the base flange 111 of the rim part 110, so that the inner extremity of the clip extends into a corresponding opening 122 of the wheel.

In addition, each spring clip 121 is provided with downwardly extending ears 125 and 126 spaced a predetermined distance apart. These ears have their edges slightly flanged at 127 and 128 to reinforce the same, and it will be perceived from Figures 14 and 15 that these flange portions 127 extend substantially around a major portion of the periphery of each of the ears 125—126.

Each ear is preferably made of a bowed shape, as shown in Figure 15, so that each ear has portions which are disposed in planes converging toward the planes of the portions of the other ear. The widest space in between the ears 125 and 126 occurs substantially midway their height as indicated generally by the reference numeral 131—131. The plane intercepting the two points 131—131 is substantially at the bottom surface of the base flange 111 of the wheel rim part. The purpose of this enlargement of the space between the wings or ears of each clip is to enable strap shown in dotted lines at A in Figure 15 of a lug or anti-skid chain to be inserted through the clip and passed through the corresponding wheel opening 122. In other words, the wheel openings 122 are usually used for a dual purpose—one to provide ventilation as noted before, and the other to provide openings through which the straps of lug or anti-skid chains can be inserted and attached to the wheel as is well known to those familiar with this art. The construction of each of my spring clips is such that it still permits of the use of the strap transversely about the cross section of the tire and through the wheel opening.

The under or lower side of the flanged edges of the two ears 125 and 126 is notched out as indicated at 130 in Figure 14 so as to provide a shoulder 132 in each of the ears which constitutes high spots over which the reinforced and strengthened beaded edge 120 of the trim ring 118 must be sprung in the application of the trim ring to the wheel.

In the application of the spring clips to the wheel, each of them is placed in position opposite a wheel opening 122 and is then pressed axially against the flanges of the wheel rim. This pressure results in the springing of the tip or extremity of the inclined portion 123 of the clip over the shoulder 115 until it is back of the shoulder and is thus spring wedged against the flange 113 of the rim part. The spring wedging of this tip portion 123 against the flange 130 results also in the wedging of the lower flanged edges 127 and 128 of the ears 125 and 126 inside of the opening against a portion 133 of the wheel body part or spider 116. Also, the curved leg or portion 124 of each clip abuts and is backed up by the curved junction of the side flange 112 and the base flange 111 of the rim part. Thus, the spring clip is firmly held in place under resilient tension. If it should be desired to remove the clip, it may be easily removed by inserting a screwdriver underneath the outer extremity of the portion 123 and prying it free of its retained engagement therewith. Any suitable pry-off tool may be used, such, for example, as a screwdriver, the edge of which may be inserted in the space between the portion 123 and the clip and the junction of the two flanges 112 and 113 of the rim part.

In the application of the trim ring 118 to the wheel, it is pressed axially against the wheel thus causing the beaded and reinforced edge to be sprung in its entirety over the high spot of shoulder 132 until it passes over and behind this high spot into the depression or groove 130, thus holding the trim ring under spring tension on the four spring clips. It will be appreciated that in this springing of the edge 120 it is not completely returned to its original diameter after it has passed over the high spot 132, and that as a consequence it is constantly under spring tension tending to hold it into tight retained engagement with the shoulders of the plurality of clips on the wheel. Of course, all of the clips are disposed in a common circle, since, as shown in Figure 12, they all are located the same distance from the center of the wheel.

Thus, I have provided a very simple and inexpensive form of spring clip which is self-retained on the wheel by reason of its own resilient wedging engagement with the parts of the wheel and which is so constructed that it is greatly rigidified, thus enabling the use of light metal and is formed with an opening for accommodating the usual lug or skid chain strap.

I claim as my invention:

1. In a wheel construction including a multi-flanged tire rim part and a body part joined thereto, spring clip means for holding a wheel cover member on the wheel comprising a plurality of spaced clips each including a generally radially extending strip disposed over a flange of the rim part and having an outer edge wedged into engagement with an annular flange of the rim part and an inner edge wedged into engagement with said body part adjacent the junction of said wheel parts, said strip having an intermediate projection constructed and arranged to be engaged by a cover member for holding the cover member on the wheel.

2. In a wheel including a multi-flanged wheel rim part and a body part joined thereto, a wheel cover retaining spring clip disposed alongside a side flange of said rim part and having in combination, a part provided with inner and outer edges spring wedged into retained engagement with said wheel parts, said engagement constituting the sole means for holding the clip on the wheel and retaining means for engaging with a cover.

3. In combination, a wheel including a multi-flanged wheel rim part and a body part joined thereto, and a wheel cover retaining spring clip disposed alongside a side flange of said rim part and having inner and outer edges spring wedged into retained engagement with said wheel parts, said engagement constituting the sole means for holding the clip on the wheel, said clip having an intermediate shoulder arranged for retaining cooperation with a wheel cover member.

4. As an article of manufacture, a spring clip for retaining a wheel cover member on a wheel comprising a strip of metal having oppositely turned edges for wedging engagement with parts of a wheel and having between said edges a shoulder for retaining cooperation with an edge of a wheel cover member, said shoulder being flanged to reinforce the same against buckling.

5. As an article of manufacture, a spring clip for retaining a wheel cover member on a wheel comprising a strip of metal having oppositely turned edges for wedging engagement with parts of a wheel and having between said edges a shoulder for retaining cooperation with an edge of a wheel cover member, said strip being longitudinally ribbed to aid the clip in resisting transverse buckling.

6. As an article of manufacture, a spring clip for retaining a wheel cover member on a wheel comprising a strip of metal having oppositely turned edges for wedging engagement with parts of a wheel and having between said edges a shoulder for retaining cooperation with an edge of a wheel cover member, one of said edges being formed into a pair of aligned wedge-shaped projections for biting engagement with spaced portions of the wheel.

7. In combination, a wheel including a multi-flanged wheel rim part and a body part joined thereto, a wheel cover retaining spring clip disposed alongside a side flange of said rim part and having inner and outer edges spring wedged into retained engagement with said wheel parts, said engagement constituting the sole means for holding the clip on the wheel, said clip having an intermediate shoulder arranged for retaining cooperation with a wheel cover member, and a wheel cover having a beaded edge comprising a plurality of turns to reinforce the same and arranged to be sprung in its entirety over said shoulder.

8. In a wheel structure including a multi-flanged tire rim part and a body part joined thereto at spaced intervals leaving openings between the joined portions of said parts, spring clip means for holding a wheel cover member on the wheel comprising a plurality of spaced clips each including a generally radially extending strip disposed over a flange of the rim part and having an outer edge wedged into engagement with an annular flange of the rim part, a radially inner portion of said strip being provided with laterally extending ears projecting into one of said wheel openings and being wedged into engagement with an adjoining portion of the body part, said ears also being provided with a shoulder over which a portion of a wheel cover is adapted to be passed for retaining cooperation therewith.

9. In a wheel structure including a multi-flanged tire rim part and a body part joined thereto at spaced intervals leaving openings between the joined portions of said parts, spring clip means for holding a wheel cover member on the wheel comprising a plurality of spaced clips each including a generally radially extending strip disposed over a flange of the rim part and having an outer edge wedged into engagement with an annular flange of the rim part, a radially inner portion of said strip being provided with laterally extending ears projecting into one of said wheel openings and being wedged into engagement with an adjoining portion of the body part, said ears also being provided with a shoulder over which a portion of a wheel cover is adapted to be passed for retaining cooperation therewith, said ears being disposed in non-parallel relationship and being spaced apart so as to provide for engagement with the portion of the body part and the cover member at spaced points.

10. In combination, a wheel including a multi-flanged rim and a body part joined thereto at spaced intervals leaving wheel openings between the joined portions of said parts, and a wheel cover retaining spring clip disposed alongside of a side flange of said rim part and having an outer edge spring-wedged into retained engagement with a flange of the rim part and an inner edge curved axially into one of said wheel openings, said clip also having adjacent its inner edge radially inwardly projecting means wedged into engagement with a portion of the body part inside of the wheel opening and provided externally of said latter wedged engagement with a shoulder for engagement with a wheel cover.

11. In combination, a wheel including a multi-flanged rim part and a body part joined thereto at spaced intervals leaving wheel openings between the joined portions of said parts, and a wheel cover retaining spring clip disposed alongside of a side flange of said rim part and having an outer edge spring-wedged into retained engagement with a flange of said rim part and a radially inner lateral projection extending into the wheel opening and wedged into engagement with an adjoining portion of said body part inside of the wheel opening.

12. As an article of manufacture, a spring clip for retaining a wheel cover member on a wheel comprising a strip of metal comprising a main body having oppositely turned extremities one of which is inclined away from said body for wedging engagement with a flange of a rim part and the other of which is provided with a stiffened projection formed for wedging engagement with a body part inside of a wheel opening, said body also being provided with an intermediate shoulder between said extremities over which a portion of a wheel cover is adapted to be pressed for retaining cooperation therewith.

GEORGE ALBERT LYON.